United States Patent
Lee (10) Patent No.: US 10,224,850 B2
(45) Date of Patent: Mar. 5, 2019

(54) OPERATING METHOD OF SYNCHRONOUS MACHINE

(71) Applicant: LSIS CO., LTD., Anyang-si, Gyeonggi-do (KR)

(72) Inventor: Eun Woo Lee, Anyang-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 149 days.

(21) Appl. No.: 15/135,174

(22) Filed: Apr. 21, 2016

(65) Prior Publication Data

US 2016/0359443 A1    Dec. 8, 2016

(30) Foreign Application Priority Data

Jun. 2, 2015   (KR) .................. 10-2015-0077707

(51) Int. Cl.
*H02P 21/22* (2016.01)
*H02P 21/00* (2016.01)
*H02P 21/20* (2016.01)

(52) U.S. Cl.
CPC .......... *H02P 21/22* (2016.02); *H02P 21/0017* (2013.01); *H02P 21/0025* (2013.01); *H02P 21/20* (2016.02); *H02P 21/50* (2016.02)

(58) Field of Classification Search
USPC .............. 318/690, 47, 48, 700, 136, 400.02, 318/400.15
See application file for complete search history.

(56) References Cited

U.S. PATENT DOCUMENTS

| | | |
|---|---|---|
| 2004/0036434 A1 | 2/2004 | Chen et al. |
| 2006/0055363 A1 | 3/2006 | Patel et al. |
| 2012/0217916 A1* | 8/2012 | Wu ............ H02P 21/0025 318/400.11 |
| 2012/0306423 A1 | 12/2012 | Si et al. |

(Continued)

FOREIGN PATENT DOCUMENTS

| | | |
|---|---|---|
| CN | 102868339 A | 1/2013 |
| JP | 2012130183 | 6/2012 |

(Continued)

OTHER PUBLICATIONS

Zordan M., "Field Weakening in Vector Controlled and DTC PMSM Drives, A Comparative Analysis," Power Electronics and Variable Speed Drives, XP10525877, Sep. 2000, 7 pages.

(Continued)

*Primary Examiner* — Eduardo Colon Santana
*Assistant Examiner* — Iftekhar Mustafa
(74) *Attorney, Agent, or Firm* — K&L Gates LLP (57) ABSTRACT

An operating method of a synchronous machine is provided, the operating method including: generating an MTPA (Maximum Torque Per Ampere) curve, based on a current limiting circle depending on a rated current of an inverter or a motor and a torque curve depending on a torque command; generating a voltage limiting ellipse, based on a DC-link voltage; displaying, on an X-Y plane, the current limiting circle, the torque curve, the MTPA curve, and the voltage limiting ellipse; and computing a d-axis current and a q-axis current, based on an intersection point between at least two of the current limiting circle, the torque curve, the MTPA curve, and the voltage limiting ellipse, displayed on the X-Y plane.

9 Claims, 8 Drawing Sheets

(56) References Cited

U.S. PATENT DOCUMENTS

2013/0009575 A1    1/2013  Yoo
2013/0151050 A1*   6/2013  Cheng ..................... B60L 7/28
                                                     701/22
2013/0320889 A1*  12/2013  Zhang ................... H02K 21/14
                                                     318/400.02

FOREIGN PATENT DOCUMENTS

JP        201317384     1/2013
JP        2014515245    6/2014

OTHER PUBLICATIONS

Shoudao Huang, "Maximum Torque Per Ampere and Flux-weakening Control for PMSM Based on Curve Fitting," Vehicle Power and Propulsion Conference (VPPC), XP31929160, Sep. 2010, 5 pages.
European Patent Office Application Serial No. 16166791.0, Search Report dated Oct. 7, 2016, 10 pages.
Japan Patent Office Application No. 2016-099592, Office Action dated Jun. 6, 2017, 2 pages.
Chinese Office Action for related Chinese Application No. 201610371265.1; dated Mar. 26, 2018; (9 pages).

\* cited by examiner

OPERATING METHOD OF SYNCHRONOUS MACHINE

CROSS-REFERENCE TO RELATED APPLICATIONS

Pursuant to 35 U.S.C. § 119(a), this application claims the benefit of earlier filing date and right of priority to Korean Patent Application Number 10-2015-0077707, filed on Jun. 2, 2015, the contents of which are all hereby incorporated by reference herein in its entirety.

TECHNICAL FIELD

The present disclosure relates to an operating method of a synchronous machine.

BACKGROUND

A synchronous machine is categorized as a permanent magnet motor and a reluctance motor, according to a fact whether a permanent magnet is included or not. Furthermore, a permanent magnet motor including a permanent magnet is categorized into an encased permanent magnet motor and a surface-mounted permanent magnet motor, depending on a method how to put the permanent magnet in a rotor.

Here, a permanent magnet motor is superior to an induction motor in its efficiency and output per volume. However, the permanent magnet motor is generally more expensive than the induction motor. Meanwhile, a reluctance motor without a permanent magnet is similar to an inductance motor in its price. However, the reluctance motor has no copper loss, because the current does not flow in a rotor of the reluctance motor. Therefore, efficiency of the reluctance motor is superior to that of the induction motor.

Meanwhile, an MTPA (Maximum Torque Per Ampere) operation may minimize the copper loss, because the machine is driven by minimum current at the same output, when considering only the copper loss excluding the iron loss, provided that a loss of a synchronous machine is categorized into a copper loss and an iron loss.

However, the conventional technology suffers from disadvantages in that an MTPV (Maximum Torque Per Voltage) curve and an initial value cannot be accurately measured and set.

SUMMARY

The present disclosure is directed to cope with the above-mentioned problems/disadvantages and it is an object of the present disclosure to provide an operating method of a synchronous machine, where the synchronous machine can compute in real-time d-axis current and q-axis current being driven in MTPA, CLVL (Current Limited Voltage Limited), and MTPV operational modes.

It is another object of the present disclosure to provide an operating method of a synchronous machine, where a stator resistance, a d-axis inductance, a q-axis inductance, and a DC (Direct Current)-link voltage are reflected in real-time, such that the d-axis current and the q-axis current can be accurately computed.

In a general aspect, an operating method of a synchronous machine is provided, the operating method comprising: generating an MTPA (Maximum Torque Per Ampere) curve, based on a current limiting circle depending on a rated current of an inverter or a motor and a torque curve depending on a torque command; generating a voltage limiting ellipse, based on a DC-link voltage; displaying, on an X-Y plane, the current limiting circle, the torque curve, the MTPA curve, and the voltage limiting ellipse; and computing a d-axis current and a q-axis current, based on an intersection point between at least two of the current limiting circle, the torque curve, the MTPA curve, and the voltage limiting ellipse, displayed on the X-Y plane.

In some exemplary embodiments, the d-axis current and the q-axis current depending on the intersection point may correspond to a current command for operating the motor in an MTPA operational mode, when the intersection point is an intersection point between the current limiting circle and the MTPA curve.

In some exemplary embodiment, the operating method may further comprise: determining whether the intersection point is an intersection point between the current limiting circle, the torque curve, and the MTPA curve; and determining an operational mode of the motor based on a reference rotor speed depending on the intersection point, upon determining that the intersection point is the intersection point between the current limiting circle, the torque curve, and the MTPA curve.

In some exemplary embodiments, the operating method may further comprise: determining whether a rotor speed of the motor is smaller than the reference rotor speed; and computing the d-axis current and the q-axis current corresponding to a current command for operating the motor in an MTPA operational mode, by combining the torque curve and the MTPA curve via a numerical-analytical method, upon determining that the rotor speed of the motor is smaller than the reference rotor speed.

In some exemplary embodiments, the step of computing the d-axis current and the q-axis current corresponding to a current command for operating the motor in an MTPA operational mode, by combining the torque curve and the MTPA curve via a numerical-analytical method, may include:
computing the d-axis current and the q-axis current using Newton's method depending on the following equations:

$$F_{MTPA} = \begin{bmatrix} F_T(i_d, i_q) \\ F_{MTPA}(i_d, i_q) \end{bmatrix}$$

$$J = \begin{bmatrix} (L_d - L_q)i_q & \lambda_f + (L_d - L_q)i_d \\ \lambda_f + 2(L_d - L_q)i_d & -2(L_d - L_q)i_q \end{bmatrix},$$

where $F_T$ refers to the toque curve, $F_{MTPA}$ refers to the MTPA curve, $L_d$ refers to a d-axis inductance, $L_q$ refers to a q-axis inductance, $\lambda_f$ refers to a magnetic flux of a permanent magnet, $i_q$ refers to a q-axis current, and $i_d$ refers to a d-axis current.

In some exemplary embodiments, the operating method may further comprise: determining whether a rotor speed of the motor is greater than the reference rotor speed, and for generating a torque corresponding to the torque command; and computing the d-axis current and the q-axis current corresponding to a current command for operating the motor in an CLVL (Current Limited Voltage Limited) operational mode, by combining the current limiting circle and the voltage limiting ellipse via a numerical-analytical method, upon determining that the rotor speed of the motor is greater than the reference rotor speed, and for generating a torque corresponding to the torque command.

In some exemplary embodiments, the step of computing the d-axis current and the q-axis current corresponding to a current command for operating the motor in an CLVL (Current Limited Voltage Limited) operational mode, by combining the current limiting circle and the voltage limiting ellipse via a numerical-analytical method, may include:

computing the d-axis current and the q-axis current using Newton's method depending on the following equations:

$$F_{CLVL} = \begin{bmatrix} F_C(i_d, i_q) \\ F_V(i_d, i_q) \end{bmatrix}$$

$$J = \begin{bmatrix} 2i_d & 2i_q \\ 2(R_s i_d - \omega_r L_q i_q) R_s & -2(R_s i_d - \omega_r L_q i_q) \omega_r L_q \\ +2(R_s i_q + \omega_r L_d i_d + \omega_r \lambda_f) \omega_r L_d & +2(R_s i_q + \omega_r L_d i_d + \omega_r \lambda_f) R_s \end{bmatrix},$$

where $F_C$ refers to the current limiting circle, $F_V$ refers to the voltage limiting ellipse, $\omega_r$ refers to a rotor speed of the motor, and $R_s$ refers to a stator resistance of the motor.

In some exemplary embodiments, the operating method may further comprise: determining whether the current limiting circle and the voltage limiting ellipse have no intersection point therebetween; and computing the d-axis current and the q-axis current corresponding to a current command for operating the motor in an MTPV (Maximum Torque Per Voltage) operational mode, by combining the voltage limiting ellipse and the torque curve via a numerical-analytical method, upon determining that the current limiting circle and the voltage limiting ellipse have no intersection point therebetween.

In some exemplary embodiments, the step of computing the d-axis current and the q-axis current corresponding to a current command for operating the motor in an MTPV (Maximum Torque Per Voltage) operational mode, by combining the voltage limiting ellipse and the torque curve via a numerical-analytical method, may include:

computing the d-axis current and the q-axis current using Newton's method depending on the following equations:

$$F_{MTPV} = \begin{bmatrix} F_{MTPV}(i_d, i_q) \\ F_V(i_d, i_q) \end{bmatrix}$$

$$J = \begin{bmatrix} 2(R_s^2 + \omega_r^2 L_d^2)(L_d - L_q) i_d + & \\ \lambda_f(R_s^2 + \omega_r^2 L_d(2L_d - L_q)) & -2(R_s^2 + \omega_r^2 L_q^2)(L_d - L_q) i_q \\ 2(R_s i_d - \omega_r L_q i_q) R_s & -2(R_s i_d - \omega_r L_q i_q) \omega_r L_q \\ +2(R_s i_q - \omega_r L_d i_d + \omega_r \lambda_f) \omega_r L_d & +2(R_s i_q + \omega_r L_d i_d + \omega_r \lambda_f) R_s \end{bmatrix},$$

where $F_V$ refers to the voltage limiting ellipse, and $F_{MTPV}$ refers to an intersection point between the voltage limiting ellipse and the torque curve.

In some exemplary embodiments, an initial value of the Newton's method may be set to have a value to which the d-axis current and the q-axis current converge.

Effects of the operating method according to an exemplary embodiment of the present disclosure may be described as follows:

According to at least one of exemplary embodiments of the present disclosure, the synchronous machine can compute in real-time d-axis current and q-axis current being driven in MTPA, CLVL (Current Limited Voltage Limited), and MTPV operational modes.

In addition, according to at least one of exemplary embodiments of the present disclosure, a stator resistance, a d-axis inductance, a q-axis inductance, and a DC (Direct Current)-link voltage may be reflected in real-time, such that the d-axis current and the q-axis current can be accurately computed.

DETAILED DESCRIPTION

Hereinafter, some exemplary embodiments of the present disclosure will be described in detail with reference to the enclosed figures. The same reference numerals will be assigned to the same or similar elements in the explanations of the figures. Thus, the redundant explanation and description of the same configuration may be omitted.

As well, the terms for the elements used in the following descriptions, "module" and "unit" are named or combined considering only easier drafting of the disclosure. Therefore, the terms do not have any distinctive meanings or functions by themselves.

In addition, when it is determined that a detailed description about known function or structure relating to the present disclosure may evade the main point of the present disclosure, such detailed description may be omitted.

In addition, various exemplary embodiments will be described more fully hereinafter with reference to the enclosed figures, in which some exemplary embodiments are shown. The present inventive concept may, however, be embodied in many different forms and should not be construed as limited to the exemplary embodiments set forth herein. Rather, the described aspect is intended to embrace all such alterations, modifications, variations, and equivalents that fall within the scope and novel idea of the present disclosure.

Meanwhile, the terms including ordinal numbers such as "first" or "second" may be used for description of various elements. However, the elements shall not be limited by such the terms. The terms are used merely to distinguish a particular element from another element.

When an element is mentioned to be "connected" to or "accessing" another component, this may mean that it is directly connected to or accessing the other component, but it is to be understood that another element may exist in-between. On the other hand, when an element is mentioned to be "directly connected" to or "directly accessing" another element, it is to be understood that there are no other elements in-between.

As used herein, the singular forms "a", "an" and "the" are intended to include the plural forms as well, unless the context clearly indicates otherwise.

As used herein, the terms such as "include" or "have" are to state that there may be in existence of features, numbers, steps, functions, elements, components described herein, or compositions thereof. Therefore, they shall not be understood as to exclude the possibility of existence or addition of one or more other features, numbers, steps, functions, elements, components described herein, or compositions thereof.

Hereinafter, some exemplary embodiments of the present disclosure will be described in detail with reference to the enclosed figures. It will be apparent to the persons skilled in the art that the present disclosure may be variously altered or modified within a range of spirits and essential features of the present disclosure.

The present disclosure relates to a method to operate a synchronous machine in MTPA operational mode, CLVL operational mode, and MTPV operational mode. A mathematical model of the synchronous machine may be referred to as the following Equation 1.

$$v_d = R_s i_d + p\lambda_d - \omega_r \lambda_q \quad \text{[Equation 1]}$$
$$v_q = R_s i_q + p\lambda_q + \omega_r \lambda_d$$
$$\lambda_d = L_d i_d + \lambda_f$$
$$\lambda_q = L_q i_q$$
$$T_e = \frac{3}{2}\frac{P}{2}(\lambda_d i_q - \lambda_q i_d) = \frac{3}{2}\frac{P}{2}(\lambda_f i_q + (L_d - L_q)i_d i_q)$$

In addition, a torque may be categorized as a magnetic torque and a reluctance torque, as in the following Equation 2.

$$T_{e,mag} = \frac{3}{2}\frac{P}{2}\lambda_f i_q, \quad T_{e,rel} = \frac{3}{2}\frac{P}{2}(L_d - L_q)i_d i_q \quad \text{[Equation 2]}$$

At first, an encased permanent magnet motor has a characteristic where a d-axis inductance and a q-axis inductance are in a relationship of $L_d < L_q$. Therefore, a reluctance torque exists in the encased permanent magnet motor.

On the other hand, a surface-mounted permanent magnet motor has a characteristic where a d-axis inductance and a q-axis inductance are in a relationship of $L_d = L_q$. Therefore, the reluctance torque becomes zero (0), while only a magnetic torque exists in the surface-mounted permanent magnet motor.

In addition, a reluctance motor does not include a permanent magnet, where $\lambda_f = 0$. Therefore, the magnetic torque becomes zero, while only a reluctance torque exists in the reluctance motor.

That is, among the three types of motors, the encased permanent magnet motor has both of the magnetic torque and the reluctance torque. Therefore, the encased permanent magnet motor can be chosen as a generalized model encompassing other types of motors. Therefore, the encased permanent magnet motor will be used as a reference for describing an operating method of a synchronous machine according to an exemplary embodiment of the present disclosure.

Figure 1:
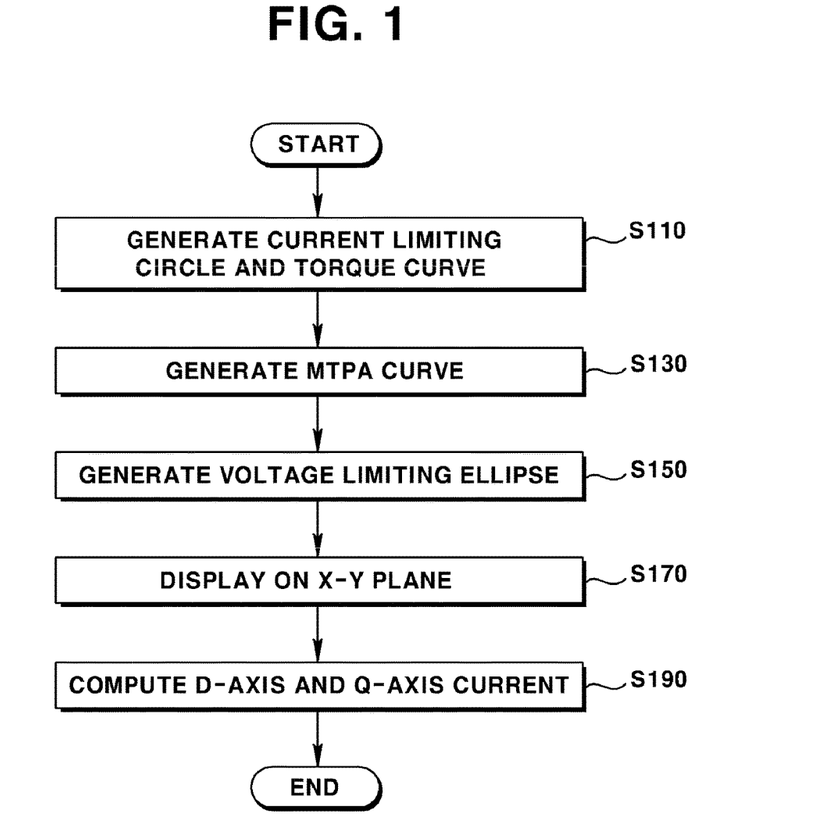
FIG. 1 is a view illustrating an operating method of a synchronous machine according to an exemplary embodiment of the present disclosure.

FIG. 1 is a view illustrating an operating method of a synchronous machine according to an exemplary embodiment of the present disclosure. Referring to FIG. 1, the operating method of a synchronous machine may include steps S110 to S190.

At first, a current limiting circle depending on a rated current of an inverter or a motor and a torque curve depending on a predetermined torque command may be generated (S110). Here, the current limiting circle and the torque curve may be predetermined depending on the rated current and the torque command.

In succession, an MTPA curve may be generated, based on the current limiting circle and the torque command that have been generated in step S110 or have been pre-generated in advance, where the MTPA curve refers to an operational point corresponding to an MTPA (Maximum Torque Per Ampere) operation (S130).

In succession, a voltage limiting ellipse may be generated, based on a DC-link voltage (S150). An inverter generates a DC-link voltage by rectifying a three-phase alternating current electric power, and generates an AC (Alternating Current) voltage by performing a PWM (Pulse Width Modulation) conversion on the DC-link voltage. Therefore, an amount of the voltage generated by the inverter is limited by an amount of the DC-link voltage.

In succession, the current limiting circle, the torque curve, the MTPA curve, and the voltage limiting ellipse that have been generated via step S110 through S150 may be displayed on an X-Y plane (S170).

In succession, a d-axis current and a q-axis current may be computed, by analyzing the X-Y plane displayed in the previous step S170 (S190). In particular, the d-axis current and the q-axis current may be computed, based on an intersection point between at least two of the current limiting circle, the torque curve, the MTPA curve, and the voltage limiting ellipse that have been displayed on the X-Y plane.

Hereinafter, each of steps included in the operating method of a synchronous machine according to an exemplary embodiment of the present disclosure will be described in more particular details with relating mathematical equations.

The current limiting circle may be generated by a current rating of an inverter or a current rating of a motor. The current limiting circle may be dependent on the following Equation 3. Equation 3 may refer to an area of a circle where the d-axis current and the q-axis current are displayed on an X-Y plane.

$$i_d^2 + i_q^2 \leq I_m^2 \quad \text{[Equation 3]}$$

The torque curve may be determined by a torque command. The torque curve may be dependent on the last formula among a set of formulas in the previously described Equation 1.

Hereupon, an MTPA curve may be generated, based on the current limiting circle and the torque command that have been generated in step S110 or have been pre-generated in advance, where the MTPA curve refers to an operational point corresponding to an MTPA (Maximum Torque Per Ampere) operation (S130).

The MTPA operation is an operating method for having such d-axis current and q-axis current to maximize a torque, when a current amount of a stator is constant.

Figure 2:
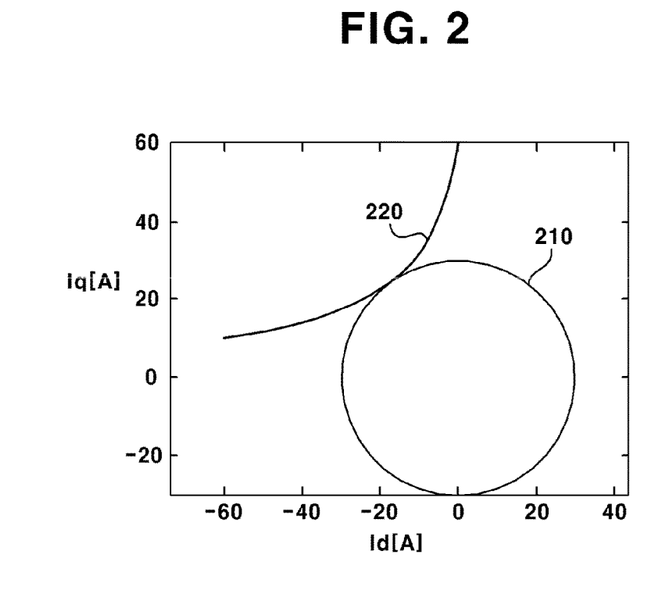
FIG. 2 is a view illustrating, in an operating method of a synchronous machine according to an exemplary embodiment of the present disclosure, a method for operating the synchronous machine to have such d-axis current and q-axis current that a torque can be maximized, when a current amount of a stator is constant.

FIG. 2 is a view illustrating, in an operating method of a synchronous machine according to an exemplary embodiment of the present disclosure, a method for operating the synchronous machine to have such d-axis current and q-axis current that a torque can be maximized, when a current amount of a stator is constant.

Referring to FIG. 2, a blue circle (210) may refer to the current limiting circle representing a stator current having a constant amount, and a pink curve (220) may refer to the torque curve having a constant amount. As the pink curve (220) moves upward, the torque may increase. Therefore, the MTPA operational point having the maximum torque may exist at a point where the two curves (210, 220) contact each other.

Meanwhile, the torque curve (220) and the current limiting circle (210) may be respectively defined as the following Equations 4 and 5, where $F_T=0$ and $F_C=0$.

$$F_T = \frac{3}{2}\frac{P}{2}(\lambda_f i_q + (L_d - L_q)i_d i_q) - T_e \quad \text{[Equation 4]}$$

$$F_C = i_d^2 + i_q^2 - I_m^2 \quad \text{[Equation 5]}$$

In addition, when formulating the Equations such that a slope at an arbitrary point ($i_d, i_q$) is the same, the following Equation 6 may be derived:

$$\frac{di_q}{di_d} = -\frac{\frac{\partial F_T}{\partial i_d}}{\frac{\partial F_T}{\partial i_q}} = -\frac{\frac{3}{2}\frac{P}{2}((L_d - L_q)i_q)}{\frac{3}{2}\frac{P}{2}(\lambda_f + (L_d - L_q)i_d)} = -\frac{2i_d}{2i_q} = -\frac{\frac{\partial F_C}{\partial i_d}}{\frac{\partial F_C}{\partial i_q}} \quad \text{[Equation 6]}$$

In addition, when arranging Equation 6, the following Equation 7, which is a hyperbola equation, may be derived:

$$(L_d - L_q)i_q^2 = \lambda_f i_d + (L_d - L_q)i_d^2 \quad \text{[Equation 7]}$$

Here, Equation 7 may be referred to an MTPA curve, which may be defined as $F_{MTPA}$ in the following Equation 8.

$$F_{MTPA} = \lambda_f i_d + (L_d - L_q)(i_d^2 - i_q^2) \quad \text{[Equation 8]}$$

Figure 3:
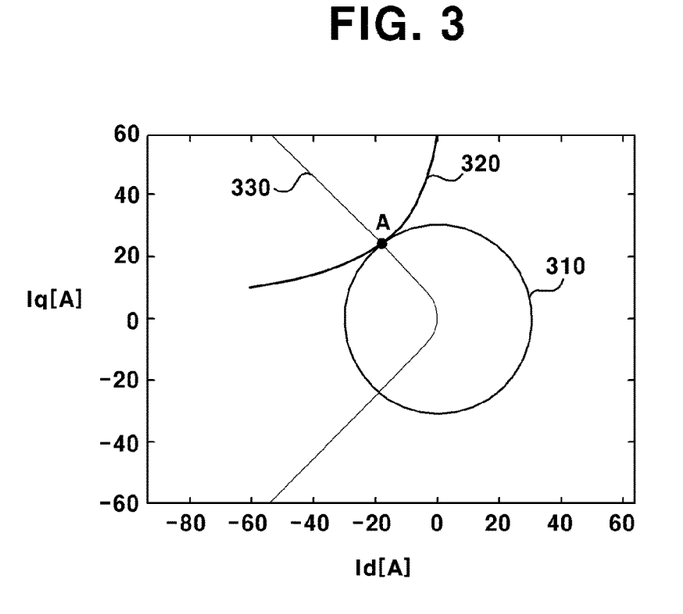
FIG. 3 is a view illustrating, in an operating method of a synchronous machine according to an exemplary embodiment of the present disclosure, an intersection point between a current limiting circle and an MTPA curve, where the intersection point between the current limiting circle and the MTPA curve is an operational point generating a maximum torque at a rated current.

FIG. 3 is a view illustrating, in an operating method of a synchronous machine according to an exemplary embodiment of the present disclosure, an intersection point between a current limiting circle and an MTPA curve, where the intersection point between the current limiting circle and the MTPA curve is an operational point generating a maximum torque at a rated current.

Referring to FIG. 3, the operational point generating the maximum torque at a rated current may be an intersection point (A) between the MTPA curve (330) and the current limiting circle (310).

Hereinafter, the voltage limiting ellipse generated based on DC-link voltage will be described in particular. The amount of voltage generated by an inverter may be limited by an amount of DC-link voltage. In a case where a SVPWM (Space Vector PWM) is used, a voltage having a phase voltage of $$\frac{V_{dc}}{\sqrt{3}}$$

in maximum can be synthesized. The amount of voltage applied to an encased permanent magnet motor may be computed from a d-axis voltage and a q-axis voltage, and may be referred to as the following Equation 9.

$$v_d^2 + v_q^2 = (R_s i_d - \omega_r L_q i_q)^2 + (R_s i_q + \omega_r L_d i_d + \omega_r \lambda_f)^2 \leq \frac{V_{dc}^2}{3} \quad \text{[Equation 9]}$$

The following Equation 10 may be derived, when the d-axis current and the q-axis current satisfying the equality of Equation 9 are parameterized by variable θ satisfying the condition of $0 \leq \theta \leq 2\pi$.

$$i_d(\theta) = a\cos\phi\cos\theta - b\sin\phi\sin\theta - i_{d0} \quad \text{[Equation 10]}$$

$$i_q(\theta) = \frac{a}{b}(a\sin\phi\cos\theta + b\cos\phi\sin\theta) - i_{q0}$$

$$a = \frac{V_{dc}/\sqrt{3}}{\sqrt{R_s^2 + \omega_r^2 L_d L_q}}$$

$$b = a\sqrt{\frac{L_q}{L_d}}$$

$$\phi = -\tan^{-1}\frac{\omega_r\sqrt{L_d L_q}}{R_s}$$

$$i_{d0} = \frac{\omega_r^2 L_q \lambda_f}{R_s^2 + \omega_r^2 L_d L_q}$$

$$i_{q0} = \frac{\omega_r R_s \lambda_f}{R_s^2 + \omega_r^2 L_d L_q}$$

Referring to Equation 10, the voltage limiting curve is ascertained to be an ellipse having a slope of φ and focuses of ($i_{d0}, i_{q0}$). The focuses and the slope of the ellipse may be varied depending on the rotor speed. In addition, the size of the ellipse may be decrease as the rotor speed increases.

Figure 4:
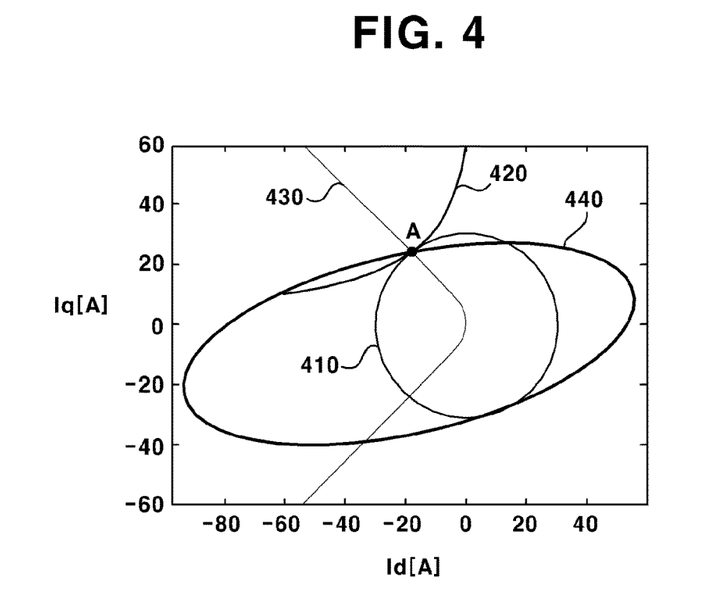
FIG. 4 is a view illustrating a voltage limiting ellipse passing through an MTPA maximum torque operational point, in an operating method of a synchronous machine according to an exemplary embodiment of the present disclosure.

FIG. 4 is a view illustrating a voltage limiting ellipse passing through an MTPA maximum torque operational point, in an operating method of a synchronous machine according to an exemplary embodiment of the present disclosure.

Referring to FIG. 4, a current limiting circle (410), a torque curve (420), an MTPA curve (430), and a voltage limiting ellipse (440) are illustrated. As the rotor speed increases, the size of the voltage limiting ellipse (440) may decrease. A reference rotor speed where the voltage limiting ellipse (440) passes through an MTPA maximum torque operational point (A) may be defined as $\omega_{rM}$. The reference rotor speed may be referred to as the following Equation 11.

$$\omega_{rM} = \frac{-b + \sqrt{b^2 - 4ac}}{2a} \quad \text{[Equation 11]}$$
$$a = (L_d I_{dm} + \lambda_f)^2 + (L_q I_{qm})^2$$
$$b = 2R_s I_{qm}((L_d - L_q)I_{dm} + \lambda_f)$$
$$c = R_s^2 I_m^2 - V_m^2$$

As illustrated in FIG. 4, the MTPA operation is available with respect to all torque commands at a rotor speed below the reference rotor speed ($\omega_{rM}$). Furthermore, the d-axis current and the q-axis current corresponding to a current command for operating the motor in an MTPA operational mode may be computed, by combining the torque curve (420) and the MTPA curve (430) via a numerical-analytical method.

In addition, according to an exemplary embodiment of the present disclosure, the d-axis current and the q-axis current may be computed using Newton's method that is easily implementable. Here, a two-dimensional Newton's method is used, since two constraint formulas are present. The two-dimensional function and Jacobian of the function may be defined as the following Equation 12.

$$F_{MTPA} = \begin{bmatrix} F_T(i_d, i_q) \\ F_{MTPA}(i_d, i_q) \end{bmatrix} \quad \text{[Equation 12]}$$
$$J = \begin{bmatrix} (L_d - L_q)i_q & \lambda_f + (L_d - L_q)i_d \\ \lambda_f + 2(L_d - L_q)i_d & -2(L_d - L_q)i_q \end{bmatrix},$$

where $F_T$ refers to the toque curve (420), $F_{MTPA}$ refers to the MTPA curve (430), $L_d$ refers to a d-axis inductance, $L_q$ refers to a q-axis inductance, $\lambda_f$ refers to a magnetic flux of a permanent magnet, $i_q$ refers to a q-axis current, and $i_d$ refers to a d-axis current.

In a case where the rotor speed of the motor is above the reference rotor speed ($\omega_{rM}$), the MTPA operation may or may not be available, depending on the amount of the torque command. The amount of d-axis current is required to be reduced in order to generate a torque corresponding to the torque command, when the MTPA operation is not available. Such operation may be referred to as a CLVL (Current Limited Voltage Limited) operation.

Figure 5:
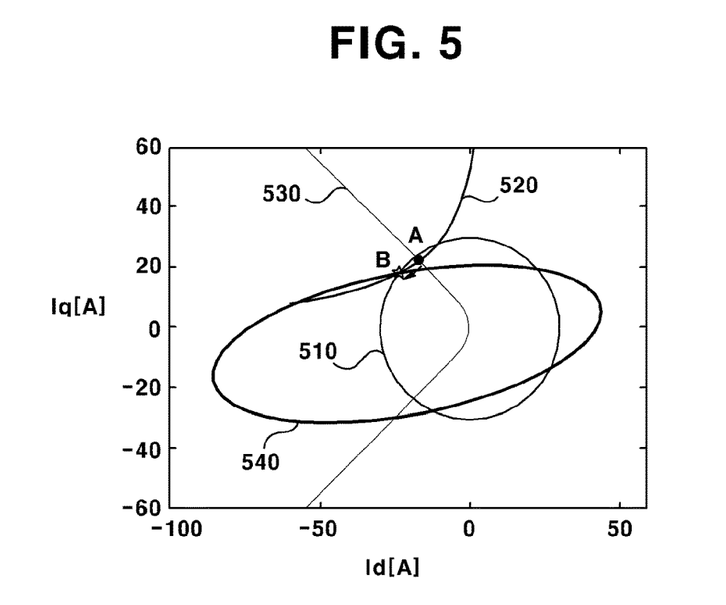
FIG. 5 is a view illustrating, in an operating method of a synchronous machine according to an exemplary embodiment of the present disclosure, an intersection point between a current limiting circle and a voltage limiting ellipse, where the intersection between the current limiting circle and the voltage limiting ellipse point is a CLVL operational point.

FIG. 5 is a view illustrating, in an operating method of a synchronous machine according to an exemplary embodiment of the present disclosure, an intersection point between a current limiting circle and a voltage limiting ellipse, where the intersection between the current limiting circle and the voltage limiting ellipse point is a CLVL operational point.

Referring to FIG. 5, the operation is required to be performed at the point (A) in order to perform an MTPA operation. However, the MTPA operation is currently not available, because the point (A) exists outside of the voltage limiting ellipse (540). Therefore, the operational point is required to be moved to the point (B). The point (B) may be determined as an intersection point (B) between the current limiting circle (510) and the voltage limiting ellipse (540).

The d-axis current and the q-axis current corresponding to a current command for operating the motor in an CLVL (Current Limited Voltage Limited) operational mode may be computed, by combining the current limiting circle (510) and the voltage limiting ellipse (540) via a numerical-analytical method, based on the intersection (B) between the current limiting circle (510) and the voltage limiting ellipse (540).

Furthermore, according to an exemplary embodiment of the present disclosure, the d-axis current and the q-axis current may be computed using Newton's method that is easily implementable. The two-dimensional function to find the CLVL operational point (B) and Jacobian of the function may be defined as the following Equation 13.

$$F_{CLVL} = \begin{bmatrix} F_C(i_d, i_q) \\ F_V(i_d, i_q) \end{bmatrix} \quad \text{[Equation 13]}$$
$$J = \begin{bmatrix} 2i_d & 2i_q \\ 2(R_s i_d - \omega_r L_q i_q)R_s & -2(R_s i_d - \omega_r L_q i_q)\omega_r L_q \\ +2(R_s i_q + \omega_r L_d i_d + \omega_r \lambda_f)\omega_r L_d & +2(R_s i_q + \omega_r L_d i_d + \omega_r \lambda_f)R_s \end{bmatrix},$$

where $F_C$ refers to the current limiting circle (510), $F_V$ refers to the voltage limiting ellipse (540), $\omega_r$ refers to a rotor speed of the motor, and $R_s$ refers to a stator resistance of the motor.

Figure 6:
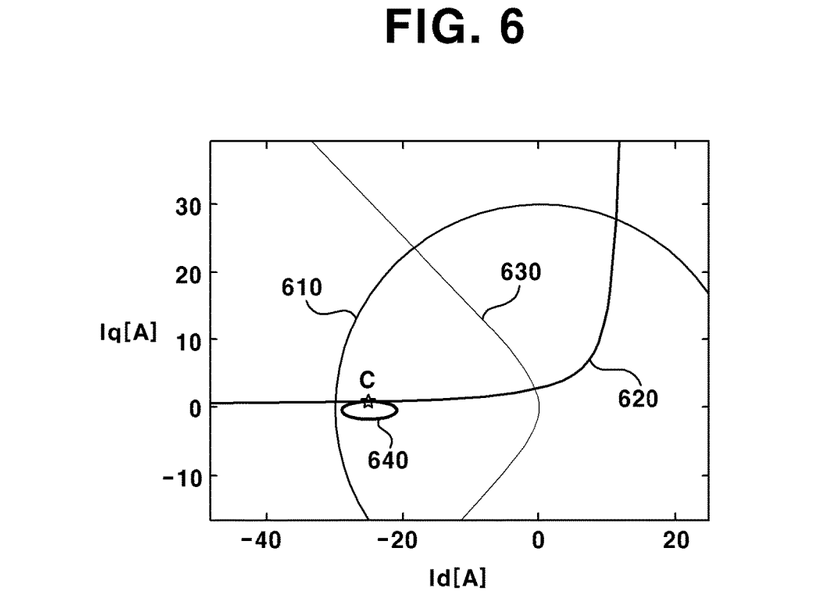
FIG. 6 is a view illustrating, in an operating method of a synchronous machine according to an exemplary embodiment of the present disclosure, a point where a voltage limiting ellipse and a torque curve contact each other, where the contacting point between the voltage limiting ellipse and the torque curve contact is an MTPV operational point.

FIG. 6 is a view illustrating, in an operating method of a synchronous machine according to an exemplary embodiment of the present disclosure, a point where a voltage limiting ellipse and a torque curve contact each other, where the contacting point between the voltage limiting ellipse and the torque curve contact is an MTPV operational point.

FIG. 6 illustrates a case where the rotor speed of the motor increases more than in the case of FIG. 5, such that the voltage limiting ellipse (640) is entered inside of the current limiting circle (610). In such case, the CVCL operational point does not exist, because there is no intersection point between the two curves (610, 640).

In addition, in such case, the intersection between the current limiting circle (610) and the voltage limiting ellipse (640) is the voltage limiting ellipse (640) itself. Therefore, the intersection point (C) between the voltage limiting ellipse (640) and the torque curve (620) may be set as the operational point (C). The operational point (C) may be referred to as an MTPV (Maximum Torque Per Voltage) operational point.

The d-axis current and the q-axis current corresponding to a current command for operating the motor in an MTPV (Maximum Torque Per Voltage) operational mode may be computed, by combining the voltage limiting ellipse (640) and the torque curve (620) via a numerical-analytical method, based on the intersection (C) between the voltage limiting ellipse (640) and the torque curve (620).

Furthermore, according to an exemplary embodiment of the present disclosure, the d-axis current and the q-axis current may be computed using Newton's method that is easily implementable. The two-dimensional function to find the MTPV operational point (C) and Jacobian of the function may be defined as the following Equation 14.

[Equation 14]

$$F_{MTPV} = \begin{bmatrix} F_{MTPV}(i_d, i_q) \\ F_V(i_d, i_q) \end{bmatrix}$$

$$J = \begin{bmatrix} 2(R_s^2 + \omega_r^2 L_d^2)(L_d - L_q)i_d + & -2(R_s^2 + \omega_r^2 L_q^2)(L_d - L_q)i_q \\ \lambda_f(R_s^2 + \omega_r^2 L_d(2L_d - L_q)) & \\ 2(R_s i_d - \omega_r L_q i_q)R_s & -2(R_s i_d - \omega_r L_q i_q)\omega_r L_q \\ +2(R_s i_q + \omega_r L_d i_d + \omega_r \lambda_f)\omega_r L_d & +2(R_s i_q + \omega_r L_d i_d + \omega_r \lambda_f)R_s \end{bmatrix}$$

where $F_V$ refers to the voltage limiting ellipse (640), and $F_{MTPV}$ refers to an intersection point between the voltage limiting ellipse (640) and the torque curve (620).

In addition, an initial value of the Newton's method is crucial for computing, accurately in real time, the d-axis current and the q-axis current corresponding to MTPA, CLVL, or MTPV operational mode. This is because an undesired value may be found depending on the initial value.

Therefore, the initial value of the Newton's method may be set to have a value to which the d-axis current and the q-axis current converge.

Therefore, the operating method of a synchronous machine according to an exemplary embodiment of the present disclosure may compute the current command in real time, when a rotor speed and a DC-link voltage are given. In addition, the current command may be computed in consideration of a stator resistor. Furthermore, the operational mode may be categorized depending on a rotor speed, and the current command may be computed in real time using Newton's method.

Figure 7:
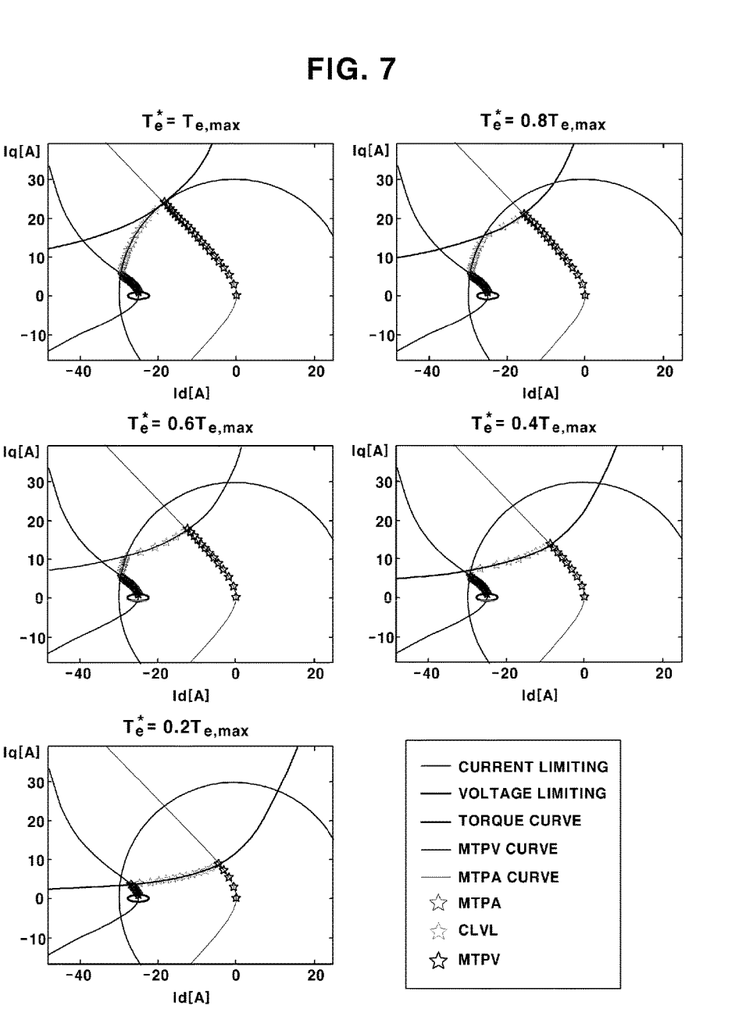
FIGS. 7 and 8 are views illustrating results of simulations where an operating method of a synchronous machine according to an exemplary embodiment of the present disclosure is simulated based on various torque commands and rotor speeds.
Figure 8:
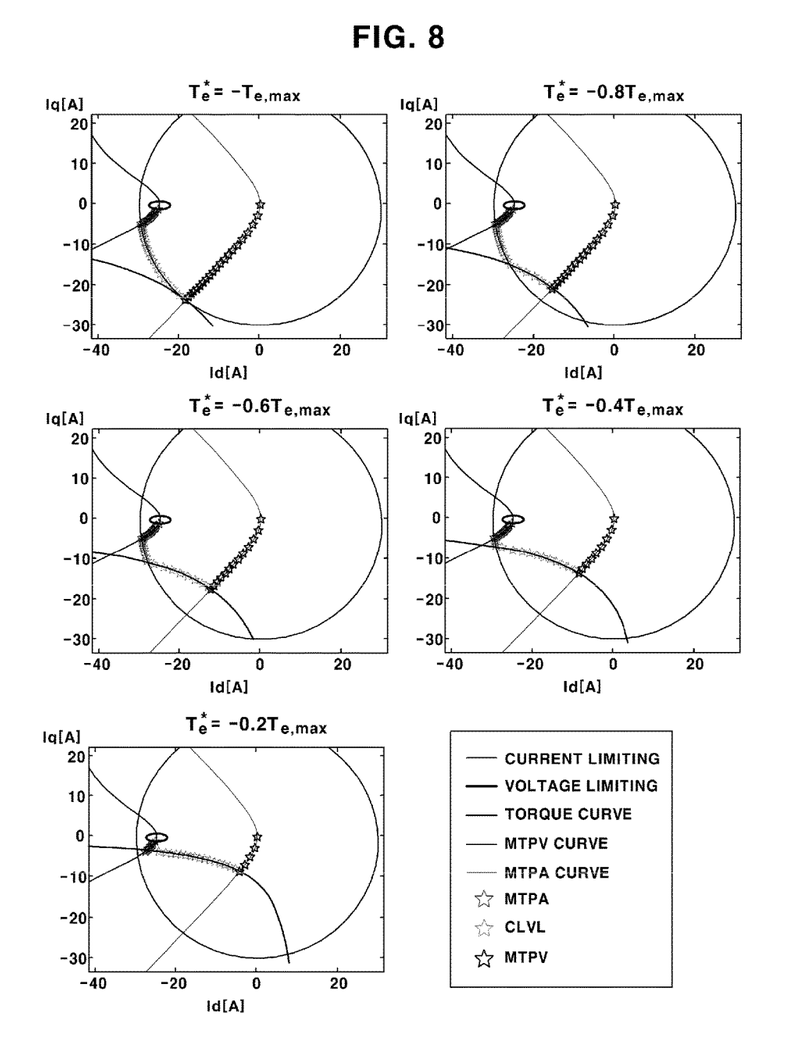

FIGS. 7 and 8 are views illustrating results of simulations where an operating method of a synchronous machine according to an exemplary embodiment of the present disclosure is simulated based on various torque commands and rotor speeds.

FIG. 7 illustrates a case where the torque command has a positive value, and FIG. 8 illustrates a case where the torque command has a negative value.

Referring to FIGS. 7 and 8, it can be ascertained that the torque curve depending on the torque command enters into the current limiting circle as an absolute value of the torque command decreases. Thus, the areas corresponding to MTPA, CLVL, and MTPV operational modes can be easily determined using the operating method according to an exemplary embodiment of the present disclosure. Thereby, the d-axis current and the q-axis current corresponding to the operational modes may be accurately computed in real-time.

Figure 9:
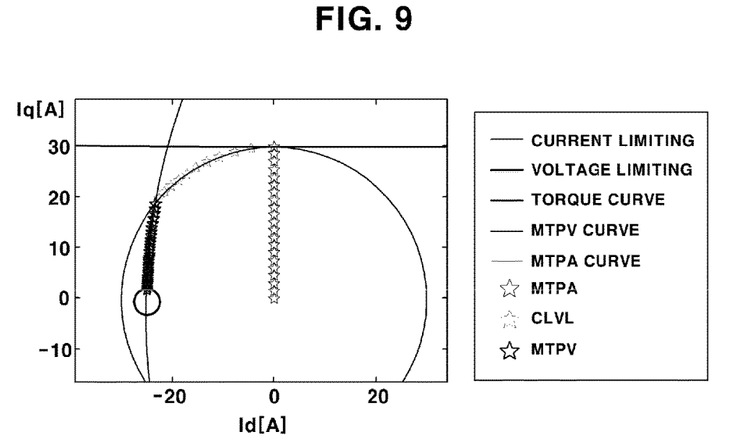
FIG. 9 is a view illustrating a result of a simulation where an operating method of a synchronous machine according to an exemplary embodiment of the present disclosure is simulated based on parameters of a surface-mounted permanent magnet motor.

FIG. 9 is a view illustrating a result of a simulation where an operating method of a synchronous machine according to an exemplary embodiment of the present disclosure is simulated based on parameters of a surface-mounted permanent magnet motor.

Referring to FIG. 9, in the surface-mounted permanent magnet motor, a d-axis inductance and a q-axis inductance are in a relationship of $L_d = L_q$. Therefore, only a magnetic torque exists in the surface-mounted permanent magnet motor, as illustrated as a pink-colored straight line in FIG. 9. Thus, the areas corresponding to MTPA, CLVL, and MTPV operational modes can be easily determined, as illustrated in FIG. 9, by applying the operating method according to an exemplary embodiment of the present disclosure to the surface-mounted permanent magnet motor. Thereby, the d-axis current and the q-axis current corresponding to the operational modes may be accurately computed in real-time.

Figure 10:
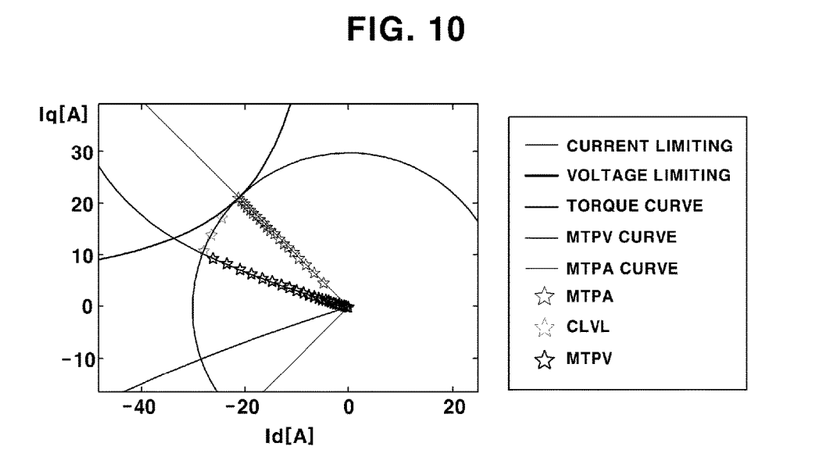
FIG. 10 is a view illustrating a result of a simulation where an operating method of a synchronous machine according to an exemplary embodiment of the present disclosure is simulated based on parameters of a reluctance motor.

FIG. 10 is a view illustrating a result of a simulation where an operating method of a synchronous machine according to an exemplary embodiment of the present disclosure is simulated based on parameters of a reluctance motor.

Referring to FIG. 10, a reluctance motor does not include a permanent magnet, where $\lambda_f = 0$. Therefore, only a reluctance torque exists in the reluctance motor, without a magnetic torque. Thus, the areas corresponding to MTPA, CLVL, and MTPV operational modes can be easily determined, as illustrated in FIG. 10, by applying the operating method according to an exemplary embodiment of the present disclosure to the reluctance motor. Thereby, the d-axis current and the q-axis current corresponding to the operational modes may be accurately computed in real-time.

Therefore, the operating method of a synchronous machine according to an exemplary embodiment of the present disclosure may compute, in real time, d-axis current and q-axis current being driven in MTPA, CLVL, and MTPV operational modes. In addition, the operating method of a synchronous machine according to an exemplary embodiment of the present disclosure may accurately compute the d-axis current and the q-axis current, by reflecting, in real-time, the stator resistance, the d-axis inductance, the q-axis inductance, and the DC-link voltage.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments within an equivalent scope. Therefore, the technical scope of the rights for the present disclosure shall be decided by rational interpretation of the appended claims and equivalents thereof.

The invention claimed is:

1. An operating method of a synchronous machine, the method comprising:
    generating an MTPA (Maximum Torque Per Ampere) curve, based on a current limiting circle depending on a rated current of an inverter or a motor and a torque curve depending on a torque command;
    generating a voltage limiting ellipse based on a DC-link voltage;
    displaying, on an X-Y plane the current limiting circle, the torque curve, the MTPA curve, and the voltage limiting ellipse;
    computing the d-axis current and the q-axis current based on an intersection point between at least two of the current limiting circle, the torque curve, the MTPA curve, and the voltage limiting ellipse, displayed on the X-Y plane;
    determining an operational mode of the motor based on a reference rotor speed depending on the intersection point, upon determining that the intersection point is a point intersecting between the current limiting circle, the torque curve, and the MTPA curve,
    determining whether a rotor speed of the motor is smaller than the reference rotor speed; and
    computing the d-axis current and the q-axis current corresponding to a current command for operating the motor in an MTPA operational mode, by combining the torque curve and the MTPA curve via a numerical-analytical method, upon determining that the rotor speed of the motor is smaller than the reference rotor speed, wherein a size of the voltage limiting ellipse decreases as the rotor speed increases, and the reference rotor speed is a speed where the voltage limiting ellipse passes the MTPA maximum torque operational point, wherein the MTPA operational mode is available with respect to all torque commands when the rotor speed is smaller than the reference rotor speed; and operating the synchronous machine to have the computed d-axis current and q-axis current.

2. The method of claim 1, wherein the step of computing the d-axis current and the q-axis current corresponding to a current command for operating the motor in an MTPA operational mode, by combining the torque curve and the MTPA curve via a numerical-analytical method, includes:

computing the d-axis current and the q-axis current using Newton's method depending on the following equations:

$$F_{MTPA} = \begin{bmatrix} F_T(i_d, i_q) \\ F_{MTPA}(i_d, i_q) \end{bmatrix}$$

$$J = \begin{bmatrix} (L_d - L_q)i_q & \lambda_f + (L_d - L_q)i_d \\ \lambda_f + 2(L_d - L_q)i_d & -2(L_d - L_q)i_q \end{bmatrix},$$

where $F_{MTPA}$ refers to a two-dimensional function, $F_T$ refers to the toque curve, $F_{MTPA}$ refers to the MTPA curve, J refers to a Jacobian function, $L_d$ refers to a d-axis inductance, $L_q$ refers to a q-axis inductance, $\lambda_f$ refers to a magnetic flux of a permanent magnet, $i_q$ refers to a q-axis current, and $i_d$ refers to a d-axis current.

3. The method of claim 2, wherein an initial value of the Newton's method is set to have a value to which the d-axis current and the q-axis current converge.

4. An operating method of a synchronous machine, the method comprising:

generating an MTPA (Maximum Torque Per Ampere) curve based on a current limiting circle depending on a rated current of an inverter or a motor and a torque curve depending on a torque command;

generating a voltage limiting ellipse based on a DC-link voltage;

displaying, on an X-Y plane the current limiting circle, the torque curve, the MTPA curve, and the voltage limiting ellipse;

computing the d-axis current and the q-axis current based on an intersection point between at least two of the current limiting circle, the torque curve, the MTPA curve, and the voltage limiting ellipse, displayed on the X-Y plane;

determining an operational mode of the motor based on a reference rotor speed depending on the intersection point, upon determining that the intersection point is a point intersecting between the current limiting circle, the torque curve, and the MTPA curve;

determining whether a rotor speed of the motor is greater than the reference rotor speed; and computing the d-axis current and the q-axis current corresponding to a current command for operating the motor in an CLVL (Current Limited Voltage Limited) operational mode, by combining the current limiting circle and the voltage limiting ellipse via a numerical-analytical method, upon determining that the rotor speed of the motor is greater than the reference rotor speed, and wherein when the rotor speed of the motor is greater than the reference rotor speed, the d-axis current is reduced in order to generate a torque corresponding to the torque command when the MTPA operation is not available, at which time a CVLC operation point is determined by an intersection point between the current limiting circle and the voltage limiting ellipse, wherein the reference rotor speed is a speed where the voltage limiting ellipse passes the MTPA maximum torque operational point; and operating the synchronous machine to have the computed d-axis current and q-axis current.

5. The method of claim 4, wherein the step of computing the d-axis current and the q-axis current corresponding to a current command for operating the motor in an CLVL (Current Limited Voltage Limited) operational mode, by combining the current limiting circle and the voltage limiting ellipse via a numerical-analytical method, includes:

computing the d-axis current and the q-axis current using Newton's method depending on the following equations:

$$F_{CLVL} = \begin{bmatrix} F_C(i_d, i_q) \\ F_V(i_d, i_q) \end{bmatrix}$$

$$J = \begin{bmatrix} 2i_d & 2i_q \\ 2(R_s i_d - \omega_r L_q i_q)R_s & -2(R_s i_d - \omega_r L_q i_q)\omega_r L_q \\ +2(R_s i_q + \omega_r L_d i_d + \omega_r \lambda_f)\omega_r L_d & +2(R_s i_q + \omega_r L_d i_d + \omega_r \lambda_f)R_s \end{bmatrix},$$

where $F_{CLVL}$ refers to a two-dimensional function, $F_C$ refers to the current limiting circle, $F_V$ refers to the voltage limiting ellipse, J refers to a Jacobian function, $L_d$ refers to a d-axis inductance, $L_q$ refers to a q-axis inductance, $\lambda_f$ refers to a magnetic flux of a permanent magnet, $i_q$ refers to a q-axis current, $i_d$ and refers to a d-axis current, $\omega_r$ refers to a rotor speed of the motor, and $R_s$ refers to a stator resistance of the motor.

6. The method of claim 5, wherein an initial value of the Newton's method is set to have a value to which the d-axis current and the q-axis current converge.

7. An operating method of a synchronous machine, the method comprising:

generating an MTPA (Maximum Torque Per Ampere) curve based on a current limiting circle depending on a rated current of an inverter or a motor and a torque curve depending on a torque command;

generating a voltage limiting ellipse based on a DC-link voltage;

displaying, on an X-Y plane the current limiting circle, the torque curve, the MTPA curve, and the voltage limiting ellipse;

computing the d-axis current and the q-axis current, based on an intersection point between at least two of the current limiting circle, the torque curve, the MTPA curve, and the voltage limiting ellipse, displayed on the X-Y plane, determining whether the current limiting circle and the voltage limiting ellipse have no intersection point therebetween;

computing the d-axis current and the q-axis current corresponding to a current command for operating the motor in an MTPV (Maximum Torque Per Voltage) operational mode, by combining the voltage limiting ellipse and the torque curve via a numerical-analytical method, upon determining that the current limiting circle and the voltage limiting ellipse have no intersection point therebetween, and wherein a point where the voltage limiting ellipse and the torque curve meets is set as an MTPV operation point, in order to generate a torque corresponding to the torque command when there is no intersection point between the voltage limiting ellipse and the current limiting circle; and operating the synchronous machine to have the computed d-axis current and q-axis current.

8. The method of claim 7, wherein the step of computing the d-axis current and the q-axis current corresponding to a current command for operating the motor in an MTPV (Maximum Torque Per Voltage) operational mode, by combining the voltage limiting ellipse and the torque curve via a numerical-analytical method, includes:

computing the d-axis current and the q-axis current using Newton's method depending on the following equations:

$$F_{MTPV} = \begin{bmatrix} F_{MTPV}(i_d, i_q) \\ F_V(i_d, i_q) \end{bmatrix}$$

$$J = \begin{bmatrix} 2(R_s^2 + \omega_r^2 L_d^2)(L_d - L_q)i_d + \lambda_f(R_s^2 + \omega_r^2 L_d(2L_d - L_q)) & -2(R_s^2 + \omega_r^2 L_q^2)(L_d - L_q)i_q \\ 2(R_s i_d - \omega_r L_q i_q)R_s + 2(R_s i_q + \omega_r L_d i_d + \omega_r \lambda_f)\omega_r L_d & -2(R_s i_d - \omega_r L_q i_q)\omega_r L_q + 2(R_s i_q + \omega_r L_d i_d + \omega_r \lambda_f)R_s \end{bmatrix},$$

where $F_{MTPV}$ refers to a two-dimensional function, $F_V$ refers to the voltage limiting ellipse, $F_{MTPV}$ refers to an intersection point between the voltage limiting ellipse and the torque curve, J refers to a Jacobian function, $L_d$ refers to a d-axis inductance, $L_q$ refers to a q-axis inductance, $\lambda_f$ refers to a magnetic flux of a permanent magnet, $i_q$ refers to a q-axis current, and $i_d$ refers to a d-axis current, $\omega_r$ refers to a rotor speed of the motor, and $R_s$ refers to a stator resistance of the motor.

9. The method of claim 8, wherein an initial value of the Newton's method is set to have a value to which the d-axis current and the q-axis current converge.

* * * * *